(12) United States Patent
Chen et al.

(10) Patent No.: US 11,543,660 B2
(45) Date of Patent: Jan. 3, 2023

(54) AUGMENTED REALITY OPTICAL MODULE AND AUGMENTED REALITY APPARATUS

(71) Applicant: SeeYA Optronics Co., Ltd., Shanghai (CN)

(72) Inventors: Guokai Chen, Shanghai (CN); Lu Liu, Shanghai (CN); Sunjie Qiu, Shanghai (CN); Lei Niu, Shanghai (CN); Bo Liu, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 240 days.

(21) Appl. No.: 17/004,497

(22) Filed: Aug. 27, 2020

(65) Prior Publication Data

US 2021/0199969 A1 Jul. 1, 2021

(30) Foreign Application Priority Data

Dec. 31, 2019 (CN) .......................... 201911418008.9

(51) Int. Cl.
*G02B 27/01* (2006.01)
*G02B 5/00* (2006.01)
*G02B 27/28* (2006.01)

(52) U.S. Cl.
CPC ......... *G02B 27/0172* (2013.01); *G02B 5/003* (2013.01); *G02B 27/283* (2013.01); *G02B 27/286* (2013.01); *G02B 2027/0123* (2013.01)

(58) Field of Classification Search
CPC .... G02B 2027/0159; G02B 2027/0169; G02B 2027/0174; G02B 2027/0185; G02B 21/0004; G02B 21/0008; G02B 21/0032; G02B 21/008; G02B 21/0092; G02B 21/06; G02B 21/16; G02B 21/18; G02B 21/24;

(Continued)

(56) References Cited

U.S. PATENT DOCUMENTS 10,282,912 B1   5/2019   Yuan et al.

FOREIGN PATENT DOCUMENTS

CN   107589546 A   1/2018
CN   107678165 A   2/2018
(Continued)

OTHER PUBLICATIONS

Chinese Second Office Action dated Nov. 26, 2021, Application No. 201911418008.9.

(Continued)

*Primary Examiner* — Collin X Beatty
*Assistant Examiner* — Grant A Gagnon
(74) *Attorney, Agent, or Firm* — W&G Law Group (57) ABSTRACT

An augmented reality optical module includes a relay lens group and a reflection lens group. The relay lens group receives and converges the light emitted by the image source. The reflection lens group comprises a first lens and a second lens. The light emitted by the image source is incident to the relay lens group and converged to form the relay image at least once, the light of the last relay image is incident to a first surface of the first lens and reflected, the reflected light is incident to a first surface of the second lens and reflected, and then incident to the first lens and transmitted through the first lens to form imaging light. The ambient light is transmitted in such a manner that the ambient light is transmitted through the second lens and the first lens, sequentially, and then emitted to be superimposed on the imaging light.

11 Claims, 8 Drawing Sheets

(58) Field of Classification Search
CPC ........ G02B 2207/121; G02B 2207/123; G02B 23/04; G02B 23/08; G02B 23/105; G02B 25/002; G02B 26/001; G02B 26/08; G02B 26/085; G02B 26/0858; G02B 26/0875; G02B 26/0883; G02B 27/0025; G02B 27/0037; G02B 27/0043; G02B 27/0103; G02B 27/0149; G02B 27/0176; G02B 27/022; G02B 27/026; G02B 27/04; G02B 27/0966; G02B 27/106; G02B 27/1093; G02B 27/12; G02B 27/141; G02B 27/147; G02B 27/30; G02B 27/40; G02B 27/4211; G02B 27/4222; G02B 27/4233; G02B 27/4238; G02B 27/4255; G02B 27/52; G02B 27/62; G02B 3/0012; G02B 3/0037; G02B 30/20; G02B 30/24; G02B 30/26; G02B 30/28; G02B 30/29; G02B 5/00; G02B 5/0231; G02B 5/0236; G02B 5/0289; G02B 5/0808; G02B 5/09; G02B 5/1842; G02B 5/1852; G02B 5/223; G02B 5/281; G02B 5/282; G02B 6/0001; G02B 6/0008; G02B 6/0021; G02B 6/0068; G02B 6/0073; G02B 6/0076; G02B 6/0083; G02B 6/0085; G02B 6/02085; G02B 6/10; G02B 6/12; G02B 6/1226; G02B 6/13; G02B 6/2706; G02B 6/278; G02B 6/2817; G02B 6/29313; G02B 6/29314; G02B 6/29317; G02B 6/29338; G02B 6/29343; G02B 6/2935; G02B 6/29367; G02B 6/29373; G02B 6/29382; G02B 6/29385; G02B 6/29392; G02B 6/35; G02B 6/3512; G02B 6/3514; G02B 6/3522; G02B 6/3548; G02B 6/3552; G02B 6/3556; G02B 6/3652; G02B 6/3676; G02B 6/3822; G02B 6/42; G02B 6/4209; G02B 6/4218; G02B 7/00; G02B 7/002; G02B 7/003; G02B 7/006; G02B 7/02; G02B 7/12; G02B 7/32
USPC ........................................................ 359/485
See application file for complete search history.

(56) References Cited

FOREIGN PATENT DOCUMENTS

| | | |
|---|---|---|
| CN | 108897136 A | 11/2018 |
| CN | 209014813 U | 6/2019 |
| WO | 2018038952 A1 | 3/2018 |

OTHER PUBLICATIONS

Chinese Office Action dated Jun. 7, 2021, Application No. 201911418008.9.

FIG. 1

(Prior Art)

AUGMENTED REALITY OPTICAL MODULE AND AUGMENTED REALITY APPARATUS

CROSS-REFERENCE TO RELATED APPLICATIONS

The present application claims priority to Chinese Patent Application No. 201911418008.9, filed on Dec. 31, 2019, the content of which is incorporated herein by reference in its entirety.

TECHNICAL FIELD

Embodiments of the present disclosure relate to augmented reality technology, and in particular, to an augmented reality optical module and an augmented reality apparatus.

BACKGROUND

Augmented Reality (AR) technology is a technology that uses a projection system to generate information superimposition of a virtual image and a real-world to improve users' perception of the real world, and a purpose of such a technology is to interact the virtual world with the real world on the screen. AR technology is widely used in many fields such as military, medicine, construction, education, engineering, film and television, entertainment and the like.

Figure 1:
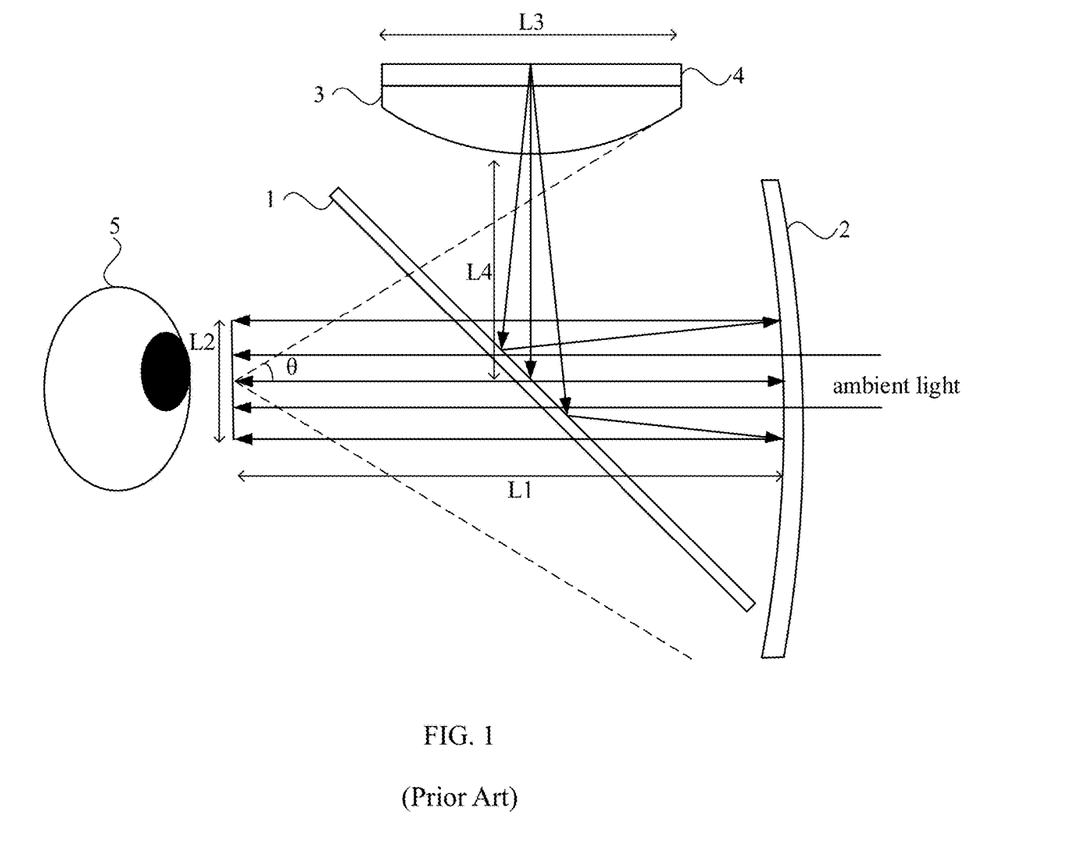
FIG. 1 is a structural schematic diagram of an augmented reality optical module known in the prior art.

FIG. 1 is a structural schematic diagram of an augmented reality optical module known in the prior art. The augmented reality optical module includes a first transflective lens 1, a second transflective lens 2, and a third lens 3, for superimposing light emitted from a display screen 4 and ambient light to produce an augmented reality effect. A basic principle thereof is as follows: the light emitted from the display screen 4 is irradiated onto the first transflective lens 1 after passing through the third lens 3, reflected by the first transflective lens 1 to the second transflective lens 2, and reflected again by the second transflective lens 2, then passes through the first transflective lens 1 and then is emitted into a human eye 5. The ambient light directly transmitted through the second transflective lens 2 and the first transflective lens 1 is incident on the human eye 5 and imaged on a retina. Thus, a virtual image generated by the display screen 4 is superimposed in a real environment to form the augmented reality effect. Since both a size L2 of entrance pupil of the human eye and a size L3 of the image source are fixed values, a system magnification is unchanged, an object distance L1 is limited by an overall contour size, resulting in a similarly limited image distance. Due to a limitation of a height L4 of the third lens 3, an upper half-field of view θ of an external real scene is positively related to the height L4 of the third lens 3, the field of view of an external field of view is limited, and the human eye will feel a sense of occlusion during actual observation.

SUMMARY

The embodiments of the present disclosure provides an augmented reality optical module and an augmented reality apparatus. The augmented reality optical module can increase the field angle to reduce the sense of occlusion when the human eye observes the real scene, thereby improving user experience.

An embodiment of the present disclosure provides an augmented reality optical module configured to superimpose light emitted by an image source on ambient light to form an augmented reality image, and including a relay lens group and a reflection lens group. The relay lens group is configured to receive and converge the light emitted by the image source to form a relay image at least once, and light of a last relay image is incident to the reflection lens group. The reflection lens group comprises a first lens and a second lens that have a transflective effect on visible light. The light emitted by the image source is transmitted along a transmission path in such a manner that the light emitted by the image source is incident to the relay lens group and converged by the relay lens group to form the relay image at least once, the light of the last relay image is incident to a first surface of the first lens and reflected by the first lens, the reflected light is incident to a first surface of the second lens and reflected by the second lens, and then incident to the first lens and transmitted through the first lens to form imaging light. The ambient light is transmitted along a transmission path in such a manner that the ambient light is transmitted through the second lens and the first lens, sequentially, and then emitted to be superimposed on the imaging light.

According to the technical solutions of the embodiments of the present disclosure, the augmented reality optical module includes the relay lens group and the reflection lens group, the light emitted by the image source is received and converged by the relay lens group to form the relay image at least once, the light of the last relay image is incident to the reflection lens group, and the light of the last relay image is transmitted to a human eye through the reflection lens group; the reflection lens group includes the first lens and the second lens that have the transflective effects on visible light; the light emitted by the image source is incident to the relay lens group and converged to form the relay image at least once, the light of the last relay image is incident to the first surface of the first lens and reflected, the reflected light is incident to the first surface of the second lens and reflected again, and the secondary reflected light is incident to the first lens and transmitted through the first lens, so as to form the imaging light; the ambient light is transmitted through the second lens and the first lens, sequentially, and then emitted to be superimposed on the imaging light to form the augmented reality image. Since the relay lens group projects the relay image to the reflection lens group, the transmission distance of the light is increased, and the relay lens group does not block the external light, thereby increasing the field of view, reducing the sense of obstruction of the human eye when observing a real scene, and improving the user experience.

DESCRIPTION OF EMBODIMENTS

The present disclosure will be further described in detail below with reference to the drawings and embodiments. It should be understood that the specific embodiments described herein are only configured to explain the present disclosure, rather than to limit the present disclosure. In addition, it should be noted that, for the purpose of description, the drawings only show part structures related to the present disclosure but not all structures.

The terms used in the embodiments of the present disclosure are merely for the purpose of describing specific embodiments and are not intended to limit the present disclosure. It should be noted that, in the embodiments of the present disclosure, terms for describing orientation and direction, such as "on", "under", "left", and "right" are described from perspectives shown in the drawings, but should not be interpreted as limitations to the embodiments of the present disclosure. In addition, in this context, it should also be understood that, when one element is described as being formed "on" or "under" another element, it can not only be formed directly "on" or "under" another element, but also formed indirectly "on" or "under" another element through an intermediate element. The terms such as "first", "second", etc. are merely for descriptive purposes to distinguish different components, rather than representing any order, quantity, or importance. Those skilled in the art can understand the specific meanings of the above terms in the present disclosure according to specific situations.

Figure 2:
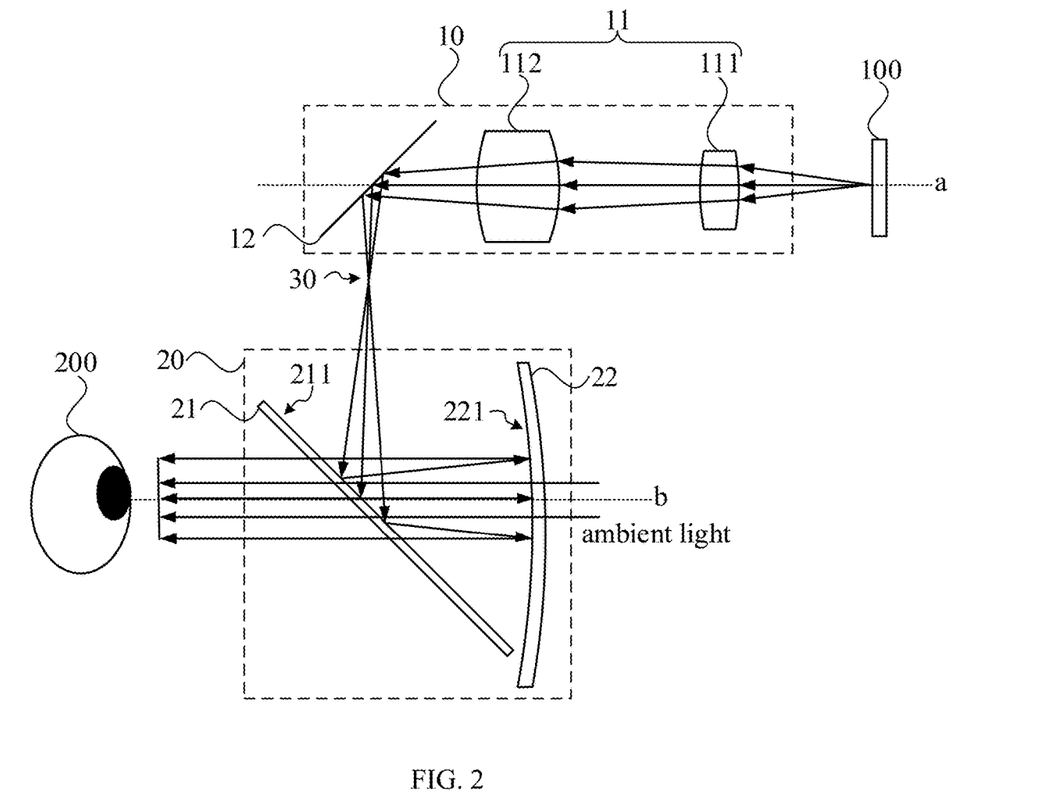
FIG. 2 is a structural schematic diagram of an augmented reality optical module according to an embodiment of the present disclosure.

FIG. 2 is a structural schematic diagram of an augmented reality optical module provided by an embodiment of the present disclosure. Referring to FIG. 2, the augmented reality optical module provided in this embodiment is configured to superimpose light emitted by the image source 100 and ambient light to form an augmented reality image. The augmented reality optical module provided by this embodiment includes a relay lens group 10 and a reflection lens group 20. The relay lens group 10 is configured to receive and converge the light emitted by the image source 100 to form a relay image at least once, light of the last relay image is incident to the reflection lens group 20. The reflection lens group 20 includes a first lens 21 and a second lens 22, and the first lens 21 and the second lens 22 have transflective effects on visible light. The light emitted by the image source 100 is transmitted along such a transmission path that the light emitted by the image source 100 is incident to the relay lens group 10 and converged to form the relay image at least once, the light of the last relay image is incident to a first surface 211 of the first lens 21 and reflected, the reflected light is incident to a first surface 221 of the second lens 22 and reflected again, and the secondary reflected light is incident to the first lens 21 and transmitted through the first lens 21, so as to form imaging light. The ambient light is transmitted in such a transmission path that the ambient light is transmitted through the second lens 22 and the first lens 21, sequentially, and emitted to be superimposed on the imaging light.

It can be understood that the image source 100 may be a display screen, such as a liquid crystal display screen, an organic light-emitting display screen, etc., for providing a virtual image. A light-exiting side of the image source 100 faces towards the relay lens group 10. The relay lens group 10 is configured to enlarge an image outputted by the image source 100 to form a relay image at least once, and the relay lens group 10 includes at least one lens. For example, as shown in FIG. 2, the relay lens group 10 includes two convex lenses, and a relay image 30 is formed at least once between the relay lens group 10 and the reflection lens group 20. In other embodiments, the relay lens group 10 may include one lens or a combination of a plurality of lenses, which can converge to form a relay image for many times, in order to meet requirements of increasing image clarity and increasing an image transmission distance. The structure of the relay lens group 10 is not specifically limited to the embodiments included in the present disclosure. The first lens 21 and the second lens 22 are both transflective lenses, and may be, for example, transflective lenses having a beam-splitting ratio of 50/50. By providing the relay lens group 10, an image distance can be increased, which is beneficial to increasing a magnification of the image provided by the image source 100 and prevent the external field of view from being blocked by the lens group, thereby increasing the field of view.

According to the technical solutions of the embodiments of the present disclosure, the light emitted by the image source is received and converged by the relay lens group to form the relay image at least once, the light of the last relay image is incident to the reflection lens group, and the light of the last relay image is transmitted to a human eye through the reflection lens group; the reflection lens group includes the first lens and the second lens that have the transflective effects on visible light; the light emitted by the image source is incident to the relay lens group and converged to form the relay image at least once, the light of the last relay image is incident to the first surface of the first lens and reflected, the reflected light is incident to the first surface of the second lens and reflected again, and the secondary reflected light is incident to the first lens and transmitted through the first lens, so as to form the imaging light; the ambient light is transmitted through the second lens and the first lens, sequentially, and then emitted to be superimposed on the imaging light to form the augmented reality image. Since the relay lens group projects the relay image to the reflection lens group, the transmission distance of the light is increased, and the relay lens group does not block the external light, thereby increasing the field of view, reducing the sense of obstruction of the human eye when observing a real scene, and improving the user experience.

Based on the above embodiments, the relay lens group includes a convergence unit and a reflection unit. The convergence unit includes at least one convergence lens, for converging the light emitted by the image source to form a relay image. The reflection unit is configured to receive light outputted by the convergence unit and reflect it to the first lens. The last relay image is located between the reflection unit and the first lens.

For example, further with reference to FIG. 2, the relay lens group 10 includes a convergence unit 11 and a reflection unit 12. The convergence unit 11 includes a first convergence lens 111 and a second convergence lens 112, for converging the light emitted by the image source 100 to form a relay image. The reflection unit 12 is configured to receive and reflect light outputted by the convergence unit 11 to the first lens 21. A volume of the augmented reality optical module can be advantageously reduced by providing the reflection unit 12. The last relay image is located between the reflection unit 12 and the first lens 21. In an embodiment, the reflection unit 12 may be a plane reflective mirror, and the first convergence lens 111 and the second convergence lens 112 may be spherical convex lenses or aspheric convex lenses, which are not limited in the present disclosure. The augmented reality optical module provided by this embodiment has characteristics of simple structure and compact structure.

In an embodiment, further referring to FIG. 2, the first lens 21 may be a flat beam-splitting reflective mirror.

It can be understood that, in the present embodiment, by providing the flat beam-splitting reflective mirror as the first lens 21, the light can be directly reflected by the flat beam-splitting reflective mirror to the second lens 22, which avoids a relatively large aberration when the light is retraced, thereby improving the imaging quality.

In an embodiment, the relay lens group further includes a first polarization modulation unit, and the first polarization modulation unit is configured to modulate the output light of the last relay image into first circularly polarized light.

Figure 3:
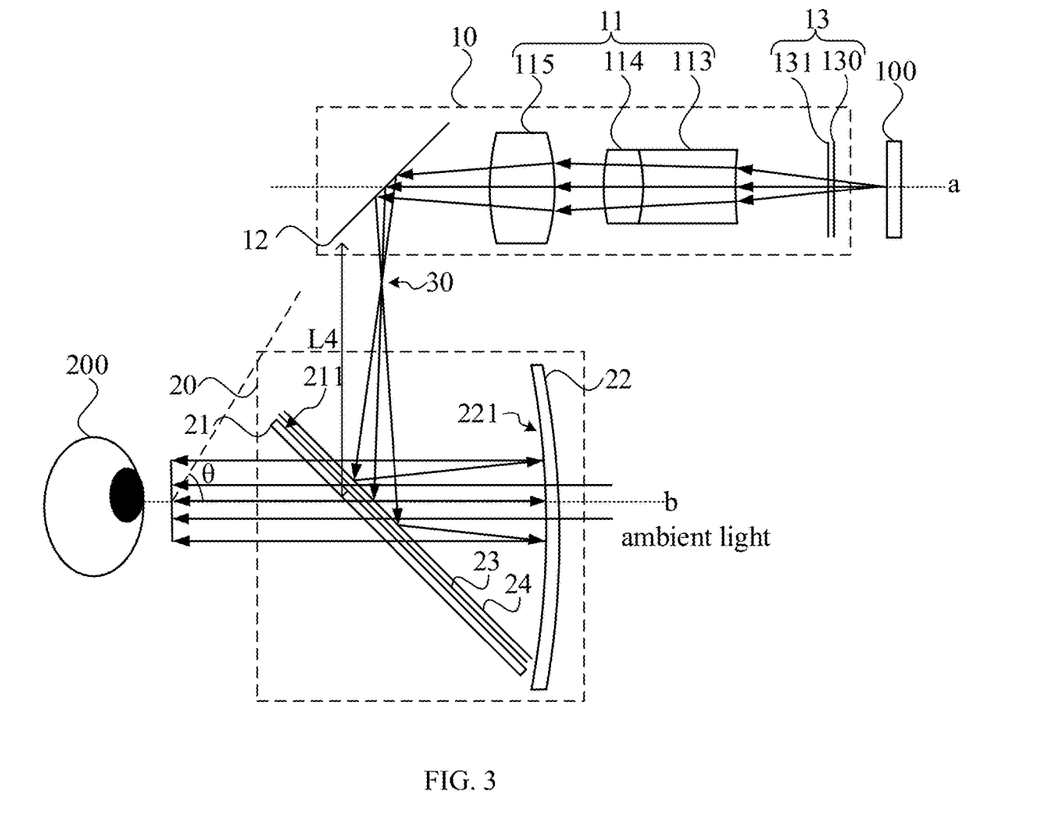
FIG. 3 is a structural schematic diagram of another augmented reality optical module according to an embodiment of the present disclosure.

FIG. 3 is a structural schematic diagram of another augmented display optical module provided by an embodiment of the present disclosure. Referring to FIG. 3, for example, the relay lens group 10 further includes a first polarization modulation unit 13. In some embodiments, the first polarization modulation unit 13 includes a first absorptive polarizer 130 and a first quarter wave plate 131, and the first quarter wave plate 131 is located on a light-exiting side of the first absorptive polarizer 130.

It should be noted that, in the embodiment shown in FIG. 3, it is only illustrative that the first polarization modulation unit 13 is directly provided on the light-exiting side of the image source 100. In other embodiments, the first polarization modulation unit 13 may be provided between any two lenses of the relay lens group 10 or provided on a light-exiting side of the reflection unit 12, which can be designed according to actual requirements in the embodiments. In an example that the first polarization modulation unit 13 is directly provided on the light-exiting side of the image source 100, the first absorptive polarizer 130 modulates the light emitted by the image source 100 into linearly polarized light, the first quarter wave plate 131 modulates the linearly polarized light into first circularly polarized light. The absorptive polarizer is a polarizer that transmits p light and absorbs s light, a polarization direction of the p light is in a plane (an incidence plane) formed by the incident light and a normal line, and a polarization direction of the s light is perpendicular to the incidence plane. In other embodiments, for example, when the light emitted by the image source 100 is the linearly polarized light, the first polarization modulation unit 13 may not be provided with the first absorptive polarizer 130.

Further referring to FIG. 3, the first surface 211 of the first lens 21 is provided with a reflective polarizer 23 and a fifth quarter wave plate 24. The first circularly polarized light is incident to the fifth quarter wave plate 24 and transmitted to become light with a second polarization direction; the light of the second polarization direction is incident to the reflective polarizer 23 and reflected, the reflected light is transmitted through the fifth quarter wave plate 24 to form second circularly polarized light, the second circularly polarized light is incident to the first surface 221 of the second lens 22 and reflected again. The second circularly polarized light reflected twice is transmitted through the fifth quarter wave plate 24 to form light with the first polarization direction, and the light with the first polarization direction is transmitted through the reflective polarizer 23 to form imaging light.

It can be understood that the reflective polarizer is to a polarizer that transmits the p light and reflects the s light. By providing the fifth quarter wave plate 24 modulating the first circularly polarized light into the light with the second polarization direction (i.e., the s light), the s light is reflected by the reflective polarizer 23 and then transmitted through the fifth quarter wave plate 24 to form the second circularly polarized light, the second circularly polarized light is incident to the first surface 221 of the second lens 22 and reflected again, the second circularly polarized light reflected twice is transmitted through the fifth quarter wave plate 24 to form the light of the first polarization direction (i.e., the p light), and the p light is transmitted through the reflective polarizer 23 and then incident to the human eye 200. Such a structure allows to completely transmit the first circularly polarized light in the relay image through the first lens 21, thereby reducing light loss and power consumption.

In an embodiment, the convergence unit includes at least one set of doublet lens. For example, with continued reference to FIG. 3, the convergence unit includes three lenses 113, 114, and 115, and the lens 113 and the lens 114 form a doublet lens. The doublet lens is provided to correct chromatic aberration in the relay lens group, so as to improve a performance of the augmented reality optical module.

Figure 4:
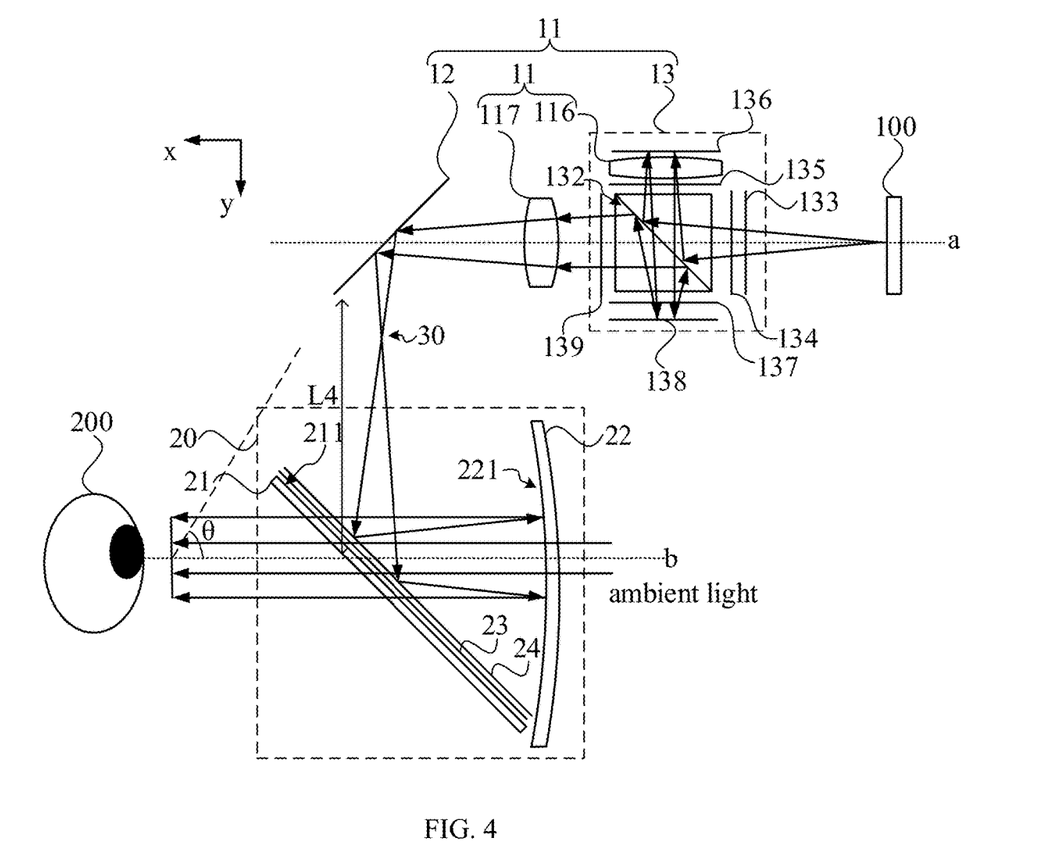
FIG. 4 is a structural schematic diagram of yet another augmented reality optical module according to an embodiment of the present disclosure.

FIG. 4 is a structural schematic diagram of yet another augmented reality optical module provided by an embodiment of the present disclosure. Referring to FIG. 4, the first polarization modulation unit 13 includes a polarization beam-splitting lens 132, a second absorptive polarizer 133, a half wave plate 134, a second quarter wave plate 135, and a first reflective mirror 136, a third quarter wave plate 137, a second reflective mirror 138, and a fourth quarter wave plate 139. The second absorptive polarizer 133, the half wave plate 134, the polarization beam-splitting lens 132, and the fourth quarter wave plate 139 are sequentially arranged along a first direction x, and the first reflective mirror 136, the second quarter wave plate 135, the polarization beam-splitting lens 132, the third quarter wave plate 137, and the second reflective mirror 138 are sequentially arranged along a second direction y. The first direction x is a direction parallel to an optical axis of the relay lens group 10 and facing away from the image source 100, and the first direction x is perpendicular to the second direction y. The light emitted by the image source 100 is transmitted through the second absorptive polarizer 133 to become light with a first polarization direction, which is then transmitted through the half wave plate 134 to become light with a second polarization direction. The light with the second polarization direction is incident to a first end of the polarization beam-splitting lens 132 and reflected by the polarization beam-splitting lens 132 to a second end and emitted, then transmitted through the second quarter wave plate 135 to become light with a first circular polarization direction, which is reflected by the first reflective mirror 136 and then transmitted through the second quarter wave plate 135 to become light with the first polarization direction. Then, the light with the first polarization direction is incident to the second end of the polarization beam-splitting lens 132 and transmitted to a third end, and then emitted, transmitted through the third quarter wave plate 137 to become the light with a second circular polarization direction, which is reflected by the second reflective mirror 138 and then transmitted through the third quarter wave plate 137 to become the light with the second polarization direction. Then, the light with the second polarization direction is incident to the third end of the polarization beam-splitting lens 132 and reflected to a fourth end, and then transmitted through the fourth quarter wave plate 139 to form the first circularly polarized light.

It can be understood that the polarization beam-splitting lens 132 may be a polarization beam splitter or a polarization beam-splitting prism. The polarization beam-splitting lens 132 is configured to transmit the incident p light and reflect the s light. The light with the first polarization direction is the p light, and the light with the second polarization direction is the s light. The first polarization modulation unit 13 provided in this embodiment can increase the transmission length of the light as much as possible and improve the performance of the augmented reality optical module while ensuring a relatively small volume.

In an embodiment, the convergence lens in the convergence unit is provided on an optical path of at least one end of the polarization beam-splitting lens.

For example, as shown in FIG. 4, the convergence unit 11 includes two convergence lenses 116 and 117, which are respectively provided at the second end and the fourth end of the polarization beam-splitting lens 132. In other embodiments, the number and positions of the lenses in the convergence unit 11 can be designed according to actual needs, which is not limited in the embodiments of the present disclosure.

With continued reference to FIG. 4, a reflective polarizer 23 and a fifth quarter wave plate 24 are provided on the first surface 211 of the first lens 21. The first circularly polarized light is incident to the fifth quarter wave plate 24 and transmitted through the fifth quarter wave plate 24 to become light with the second polarization direction. The light with the second polarization direction is incident to the reflective polarizer 23 and reflected by the reflective polarizer 23, the reflected light is transmitted through the fifth quarter wave plate 24 to form the second circularly polarized light, which is then incident to the first surface 221 of the second lens 22 and reflected by the second lens 22. The second circularly polarized light reflected twice is transmitted through the fifth quarter wave plate 24 to form light with the first polarization direction, and the light with the first polarization direction is transmitted through the reflective polarizer 23 to form imaging light.

In the embodiment shown in FIG. 4, a light transmission mode in the reflection lens group 20 is the same as that in FIG. 3, which will not be described in detail herein.

In an embodiment, the optical axis of the relay lens group and an optical axis of the reflection lens group are perpendicular to each other.

For example, in the embodiments shown in FIGS. 2 to 4, the optical axis a of the relay lens group 10 and the optical axis b of the reflection lens group 20 are arranged in parallel. In other implementations, any angle may be included between the optical axis a of the relay lens group 10 and the optical axis b of the reflection lens group 20, and it should be understood that, when the optical axis a and the optical axis b are perpendicular, the volume of the module can be advantageously reduced to achieve a compact structure of the module.

In an embodiment, the first surface of the first lens is any one of a spherical surface, an aspheric surface, or a free-form surface.

In an embodiment, the first surface of the second lens is any one of a spherical surface, an aspheric surface, or a free-form surface.

For example, in the embodiment shown in FIG. 3, the first surface 221 of the second lens 22 is a free-form surface satisfying:

$$z = \frac{c\rho^2}{1 + [1 - (1+k)c^2\rho^2]^{1/2}} + \sum_{i=1}^{N} A_i E_i(x, y);$$

where c is a radius of curvature, k is a quadric surface coefficient, $\rho^2 = x^2 + y^2$, N is a total number of polynomial coefficients in a series, $A_i$ is a coefficient of an $i^{th}$ expansion formula, $E_i(x,y)$ is an expanded polynomial about x and y, the polynomial is just a power series in x and y directions, each data value at a positions where x and y are equal will be divided by one normalized radius, to get one polynomial coefficient having no dimension. Table 1 shows parameters of the surface shape of the first surface 221 of the second lens 22:

TABLE 1

Parameters of Surface Shape of Free-form Surface

| | |
|---|---|
| Center Curvature Radius | −33.9800 |
| Quadratic Conic Coefficient | −3.9629 |
| Normalized Radius | 13.0000 |
| Max Term | 35.0000 |
| X2Y0 Coefficient | −0.1242 |
| X0Y2 Coefficient | −0.1240 |
| X2Y1 Coefficient | 0.0136 |
| X0Y3 Coefficient | 0.0053 |
| X4Y0 Coefficient | −0.1890 |
| X2Y2 Coefficient | −0.3744 |
| X0Y4 Coefficient | −0.1886 |
| X4Y1 Coefficient | −0.0072 |
| X2Y3 Coefficient | −0.0087 |
| X0Y5 Coefficient | −0.0028 |
| X6Y0 Coefficient | 0.0232 |
| X4Y2 Coefficient | 0.0554 |
| X2Y4 Coefficient | 0.0739 |
| X0Y6 Coefficient | 0.0220 |
| X6Y1 Coefficient | −0.0007 |
| X4Y3 Coefficient | 0.0077 |

The lens 115 is an even-order aspheric lens, which is mainly used to correct off-axis aberrations, and a formula of the surface shape satisfies:

$$z = \frac{c\rho^2}{1 + [1 - (1+k)c^2\rho^2]^{1/2}} + a_1 r^2 + a_2 r^4 + a_3 r^6 + a_4 r^8 + a_5 r^{10} + a_6 r^{12},$$

where c is a radius of curvature, k is a quadric surface coefficient, $\rho^2 = x^2 + y^2$, $a_1 \sim a_6$ are respectively the coefficients corresponding to respective even-order terms, and Table 2 shows parameters of the surface shape of the aspheric surface:

TABLE 2

Parameters of Surface Shape of Aspherical Surface

| | Surface No. | |
|---|---|---|
| | 1 | 2 |
| Center Curvature Radius | −19.3468 | 18.0075 |
| Quadratic Conic Coefficient | 2.366653 | −0.91453 |
| r^2 Coefficient | 0 | 0 |
| r^4 Coefficient | 0.000124 | −1.9E−05 |
| r^6 Coefficient | −1.9E−06 | −7.1E−07 |
| r^8 Coefficient | 8.3E−08 | 3.99E−08 |
| r^10 Coefficient | −1.4E−09 | −7.4E−10 |
| r^12 Coefficient | 9.24E−12 | 5.46E−12 |

Surface No. 1 represents a surface of the lens 115 facing away from the image source 100, and Surface No. 2 represents a surface of the lens 115 close to the image source 100.

Figure 5:
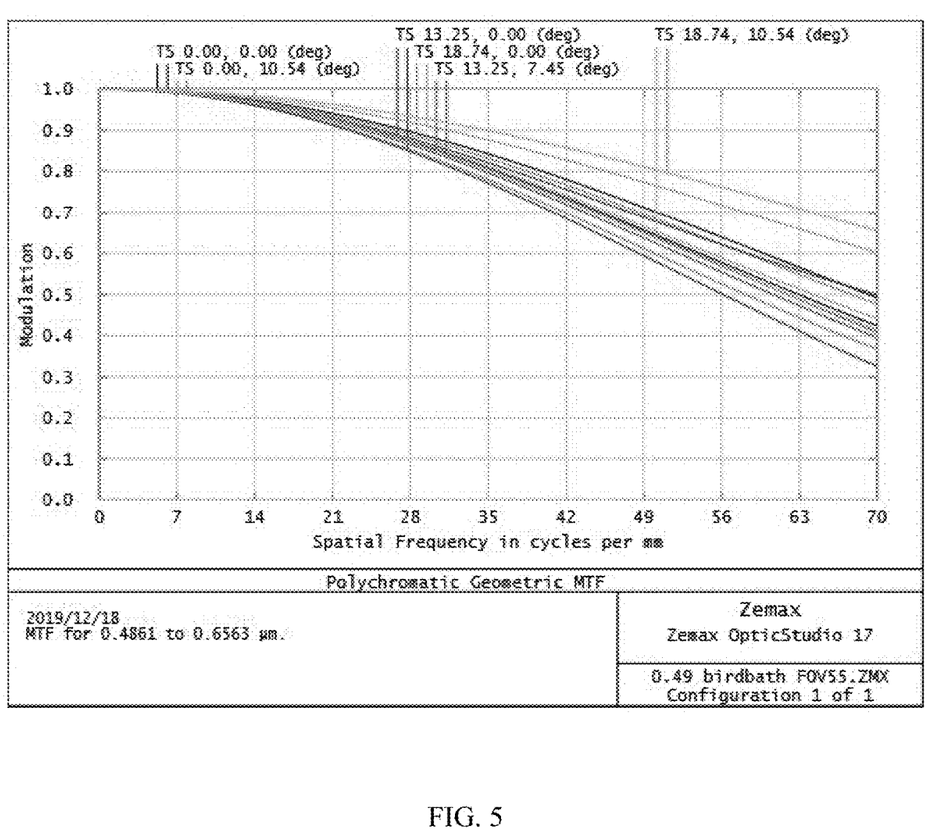
FIG. 5 is a schematic diagram of an optical transfer function MTF curve of the optical system shown in FIG. 3.

This embodiment can sufficiently increase an object distance. In this embodiment, a height L4 of the reflection unit 12 in the relay lens group 10 is 18 mm, and a half field of view θ of the external real scene is greater than 45°, which meets requirements of observing the external real scene of the human eyes. In addition, compared with the conventional solution, the doublet lens provides more design variables such as lens thickness, radius of curvature, and surface shape parameters, so that the aberration of the system can be optimized to obtain a better imaging effect. FIG. 5 is a schematic diagram of the optical transfer function MTF curve of the optical system in FIG. 3, and the optical system allows the MTF of each field of view (center and edge field of view) to be greater than 0.3 at a spatial resolution of 60 lp/mm (line pair/mm), thereby having good imaging performance.

For example, in the embodiment shown in FIG. 4, the first surface 221 of the second lens 22 is a free-form surface satisfying:

$$z = \frac{c\rho^2}{1 + [1-(1+k)c^2\rho^2]^{1/2}} + \sum_{i=1}^{N} A_i E_i(x, y);$$

where c is a radius of curvature, k is a quadric surface coefficient, $\rho^2 = x^2 + y^2$, N is a total number of polynomial coefficients in a series, $A_i$ is a coefficient of the i-th expansion formula, $E_i(x,y)$ is an expanded polynomial about x and y, the polynomial is just a power series in x and y directions, each data value at a positions where x and y are equal will be divided by one normalized radius, to get one polynomial coefficient having no dimension. Table 3 shows parameters of the surface shape of the first surface 221 of the second lens 22:

TABLE 3

| Parameters of Surface Shape of Free-form Surface | |
|---|---|
| Center Curvature Radius | −6.5410771 |
| Quadratic Conic Coefficient | −1.030544 |
| Normalized Radius | 13 |
| Max Term | 35 |
| X2Y0 Coefficient | 14.12598 |
| X0Y2 Coefficient | 14.08048 |
| X2Y1 Coefficient | −0.00172 |
| X0Y3 Coefficient | 0.013411 |
| X4Y0 Coefficient | −0.75042 |
| X2Y2 Coefficient | −1.49684 |
| X0Y4 Coefficient | −0.73881 |
| X4Y1 Coefficient | 0.000628 |
| X2Y3 Coefficient | 0.013994 |
| X0Y5 Coefficient | −0.02339 |
| X6Y0 Coefficient | 0.044693 |
| X4Y2 Coefficient | 0.155136 |
| X2Y4 Coefficient | 0.131021 |

Figure 6:
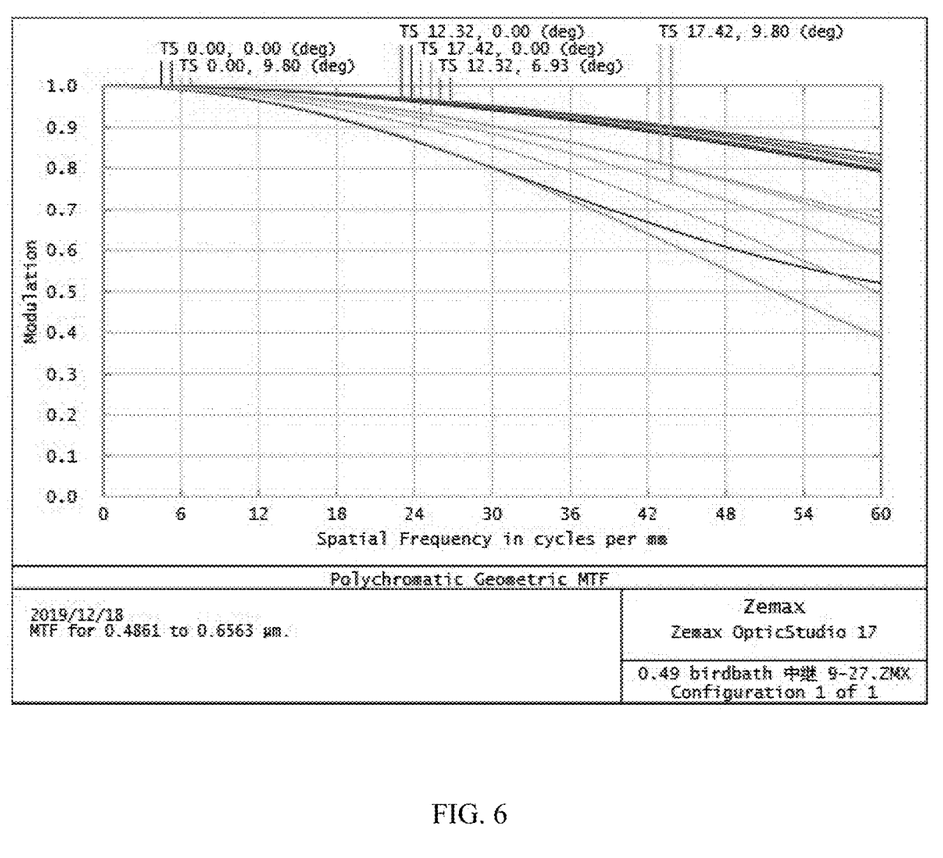
FIG. 6 is a schematic diagram of an MTF curve of the optical system shown in FIG. 4.

The lenses 116 and 117 are spherical lenses, and this embodiment can well increase the object distance. In this embodiment, the height L4 of the reflection unit 12 in the relay lens group 10 is 15 mm, and the half field of view θ of the external real scene is about 42°. FIG. 6 is a schematic diagram of the optical transfer function MTF curve of the optical system shown in FIG. 4, and the optical system allows the optical transfer function of each field of view (center and edge field of view) to be greater than 0.3 at a spatial resolution of 60 lp/mm, thereby having a good imaging performance.

In an embodiment, the first surface of the first lens and/or the first surface of the second lens are plated with a transflective film.

Figure 7:
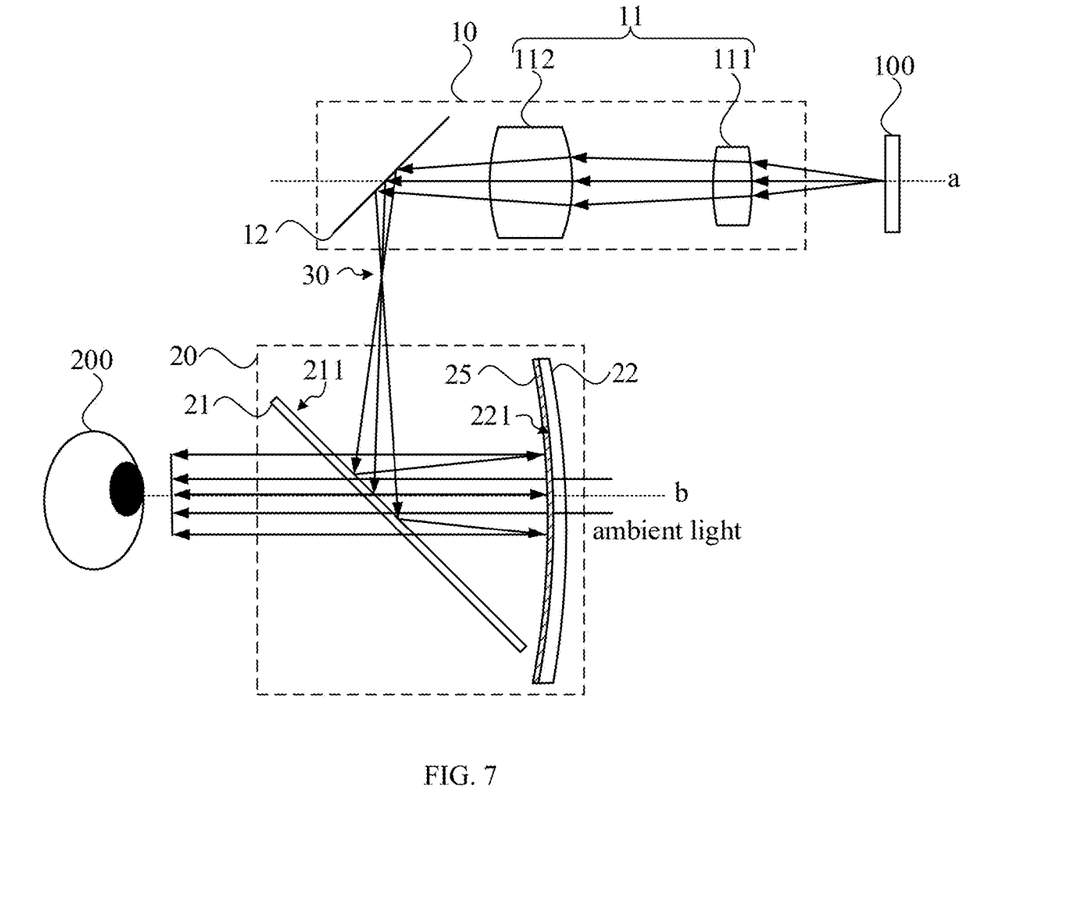
FIG. 7 is a structural schematic diagram of yet another augmented reality optical module according to an embodiment of the present disclosure.

For example, FIG. 7 is a structural schematic diagram of yet another augmented reality optical module provided by an embodiment of the present disclosure. Referring to FIG. 7, the first surface 221 of the second lens 22 is coated with a transflective film 25. It can be understood that, in an embodiment, the transflective film 25 may have a beam-splitting ratio of 50/50. In other embodiments, the transflective film 25 may also be disposed on the other surface, and a transflective ratio of the transflective film 25 can be set according to actual needs to adjust a brightness ratio of the virtual image to the ambient light. For example, when the brightness of the ambient light is required to be relatively high, the transflective ratio of the transflective film 25 can be set to be 60/40, thereby transmitting more ambient light; when the brightness of the image of the image source is required to be relatively high, the transflective ratio of the transflective film 210 can be set to be 40/60. It can be designed according to actual needs in specific embodiments, so as to adapt to different application scenarios. Further, in other embodiment, the transflective film may be provided on the first surface 211 of the first lens 21, or the transflective film is provided on surfaces of both lens, which may be flexibly selected according to actual requirements during actual implementation.

Figure 8:
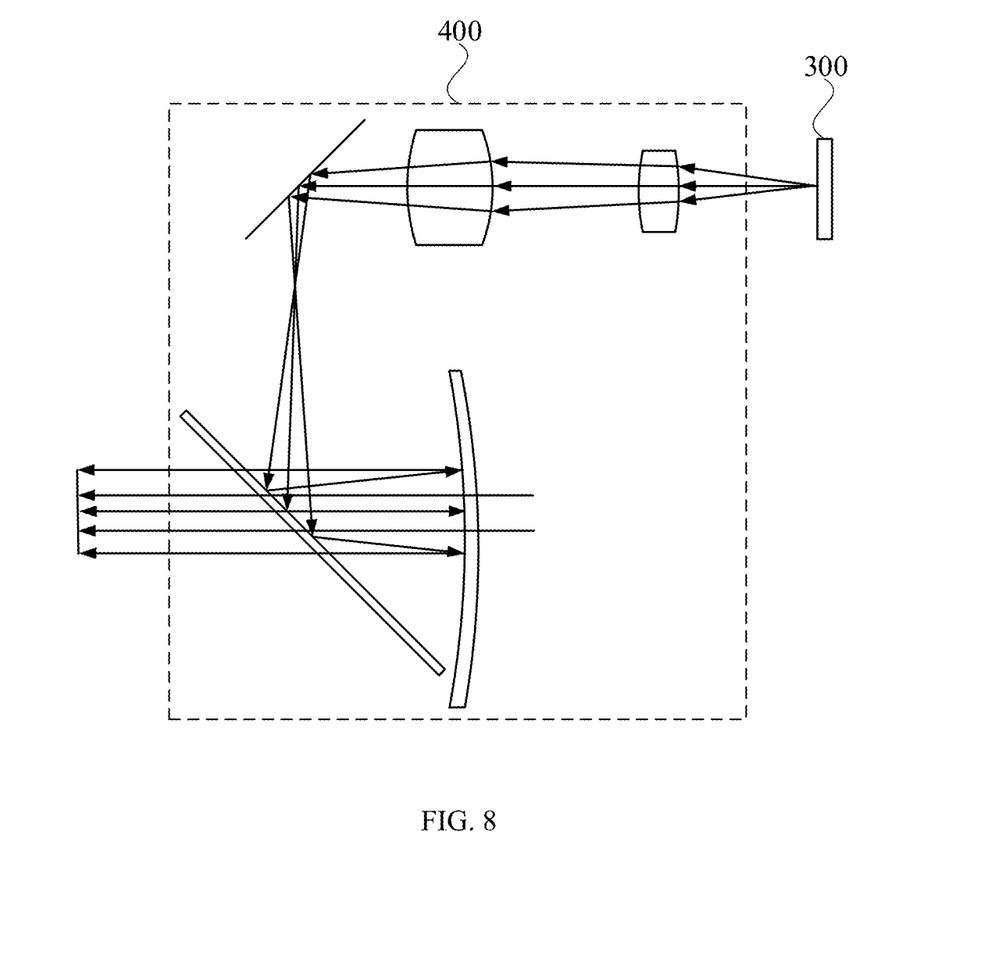
FIG. 8 is a structural schematic diagram of an augmented reality apparatus according to an embodiment of the present disclosure.

FIG. 8 is a structural schematic diagram of an augmented reality apparatus according to an embodiment of the present disclosure. Referring to FIG. 8, the augmented reality apparatus provided in this embodiment includes a display screen 300 and the augmented reality optical modules 400 described in any one of the above embodiment, and the delay lens group of the augmented reality optical module 400 is located on a light-exiting side of the display screen 300. In an embodiment, the display screen 300 includes a liquid crystal display screen or an organic light-emitting display screen.

The display screen 300 can also be an OLED on Silicon display screen. The OLED on Silicon display screen is based on a single crystal silicon wafer, having a pixel size about 1/10 of that of a conventional display, and it has advantages such as low power consumption, small volume and high resolution and thus is very suitable for the augmented reality apparatuses for near-to-eye display.

The augmented reality apparatus provided by the embodiment of the present disclosure includes the augmented reality optical modules provided by any one of the above embodiments, and has the same or corresponding technical effects, which will not be described in detail herein.

It should be understood that the above are only the preferred embodiments of the present disclosure and the applied technical principles. Those skilled in the art will understand that the present disclosure is not limited to these specific embodiments described above, and can made various obvious changes, readjustments, combinations and substitutions without departing from the scope of the present disclosure. Therefore, although the present disclosure is described in detail through the above embodiments, the present disclosure is not limited thereto, and other equivalent embodiments are included without departing from the concept of the present disclosure. The scope of the present disclosure is defined by the appended claims.

What is claimed is:

1. An augmented reality optical module, for superimposing light emitted by an image source on ambient light to form an augmented reality image, the augmented reality optical module comprising:
   a relay lens group; and
   a reflection lens group,
   wherein the relay lens group is configured to receive and converge the light emitted by the image source to form a relay image at least once, and light of a last relay image is incident to the reflection lens group,
   wherein the reflection lens group comprises a first lens and a second lens that have a transflective effect on visible light,
   wherein the light emitted by the image source is transmitted along a transmission path in such a manner that the light emitted by the image source is incident to the relay lens group and converged by the relay lens group to form the relay image at least once, the light of the last relay image is incident to a first surface of the first lens and reflected by the first lens, the reflected light is incident to a first surface of the second lens and reflected by the second lens, and then incident to the first lens and transmitted through the first lens to form imaging light, and
   wherein the ambient light is transmitted along a transmission path in such a manner that the ambient light is transmitted through the second lens and the first lens, sequentially, and then emitted to be superimposed on the imaging light,
   wherein the relay lens group further comprises a first polarization modulation unit configured to modulate the light of the last relay image into first circularly polarized light,
   wherein the first polarization modulation unit comprises a polarization beam-splitting lens, a second absorptive polarizer, a half wave plate, a second quarter wave plate, a first reflective mirror, a third quarter wave plate, a second reflective mirror, and a fourth quarter wave plate,
   wherein the second absorptive polarizer, the half wave plate, the polarization beam-splitting lens and the fourth quarter wave plate are sequentially arranged along a first direction, the first reflective mirror, the second quarter wave plate, the polarization beam-splitting lens, the third quarter wave plate, and the second reflective mirror are sequentially arranged along a second direction, the first direction is a direction parallel to an optical axis of the relay lens group and facing away from the image source, and the first direction is perpendicular to the second direction,
   wherein the light emitted by the image source is transmitted through the second absorptive polarizer to become light of a first polarization direction, and the light of the first polarization direction is then transmitted through the half wave plate to become light of a second polarization direction,
   the light of the second polarization direction is incident to a first end of the polarization beam-splitting lens, reflected by the polarization beam-splitting lens to a second end and emitted from the second end, and then transmitted through the second quarter wave plate to become light with a first circular polarization direction, and the first circular polarization direction is reflected by the first reflective mirror and then transmitted through the second quarter wave plate to become the light with the first polarization direction,
   the light of the first polarization direction is incident from the second end of the polarization beam-splitting lens, then transmitted to a third end and emitted from the third end, then transmitted through the third quarter wave plate to become light with a second circular polarization direction, and the light with the second circular polarization direction is reflected by the second reflective mirror and then transmitted through the third quarter wave plate to become the light with the second polarization direction, and
   the light with the second polarization direction is incident from the third end of the polarization beam-splitting lens, then reflected to a fourth end and emitted from the fourth end, and then transmitted through the fourth quarter wave plate to form the first circularly polarized light.

2. The augmented reality optical module according to claim 1, wherein an optical axis of the relay lens group is perpendicular to an optical axis of the reflection lens group.

3. The augmented reality optical module according to claim 1, wherein the first lens is a flat beam-splitting reflective mirror; or
   the first surface of the first lens is any one of a spherical surface, an aspheric surface, or a free-form surface.

4. The augmented reality optical module according to claim 1, wherein the first surface of the second lens is any one of a spherical surface, an aspherical surface or a free-form surface.

5. The augmented reality optical module according to claim 1, wherein the first surface of the first lens and/or the first surface of the second lens are each plated with a transflective film.

6. The augmented reality optical module according to claim 1, wherein the relay lens group comprises a convergence unit and a reflection unit,
   wherein the convergence unit comprises at least one convergence lens configured to converge the light emitted by the image source to form the relay image, and the reflection unit is configured to receive and reflect light outputted by the convergence unit to the first lens, and
   wherein the last relay image is located between the reflection unit and the first lens.

7. The augmented reality optical module according to claim 6, wherein the first polarization modulation unit comprises a first absorptive polarizer, and a first quarter wave plate located on a light-exiting side of the first absorptive polarizer.

8. The augmented reality optical module according to claim 6, wherein the convergence lens in the convergence unit is provided on an optical path of at least one end of the polarization beam-splitting lens.

9. The augmented reality optical module according to claim 6, wherein a reflective polarizer and a fifth quarter wave plate are provided on the first surface of the first lens,
   wherein the first circularly polarized light is incident to the fifth quarter wave plate and transmitted through the fifth quarter wave plate to become the light with the second polarization direction,
   the light with the second polarization direction is incident to the reflective polarizer and reflected by the reflective polarizer, the reflected light is transmitted through the fifth quarter wave plate to form second circularly polarized light, which is then incident to the first surface of the second lens and reflected by the second lens, and
   the second circularly polarized light that is reflected twice is transmitted through the fifth quarter wave plate to form the light with the first polarization direction, and the light with the first polarization direction is transmitted through the reflective polarizer to form the imaging light.

10. An augmented reality apparatus, comprising:
a display screen; and
the augmented reality optical module according to claim 1,
wherein the relay lens group of the augmented reality optical module is located on a light-exiting side of the display screen.

11. The augmented reality apparatus according to claim 10, wherein the display screen comprises a liquid crystal display screen or an organic light-emitting display screen.

* * * * *